United States Patent [19]

Ingerson et al.

[11] Patent Number: 5,713,500
[45] Date of Patent: Feb. 3, 1998

[54] STORAGE BOX

[76] Inventors: Sidney D. Ingerson, P.O. Box 248, Kenmare, N. Dak. 58746; Jerol H. Staael, Rte. 1, Box 52, Stanley, N. Dak. 58784

[21] Appl. No.: 593,166

[22] Filed: Feb. 1, 1996

[51] Int. Cl.⁶ ................................................. B60R 9/055
[52] U.S. Cl. ........................ 224/404; 280/901; 296/37.6; D12/423
[58] Field of Search ........................ 224/401, 402, 224/403, 404; 280/901; 296/37.6, 57.1; D12/400, 409, 410, 412, 413, 415, 423; 220/324, 334

[56] References Cited

U.S. PATENT DOCUMENTS

| | | | |
|---|---|---|---|
| D. 244,927 | 7/1977 | Anthon, III | D12/410 |
| D. 265,897 | 8/1982 | Gerber | D12/413 |
| D. 331,836 | 12/1992 | Newby, Sr. | D12/423 |
| D. 369,342 | 4/1996 | Williams | D12/423 |
| 3,972,541 | 8/1976 | Feterl | 280/901 |
| 4,861,093 | 8/1989 | Chapman | 296/57.1 |
| 4,946,215 | 8/1990 | Taylor | 224/404 |
| 5,080,250 | 1/1992 | Dickinson et al. | 224/404 |
| 5,303,947 | 4/1994 | Gerber | 296/57.1 |
| 5,498,049 | 3/1996 | Schlachter | 296/37.6 |
| 5,518,158 | 5/1996 | Matlack | 296/37.6 |

OTHER PUBLICATIONS

Knaack Manufacturing Company: "Weather Guard"; Telephony magazine, Jan. 7, 1974, p. 81.

*Primary Examiner*—Henry J. Recla
*Assistant Examiner*—Gregory M. Vidovich
*Attorney, Agent, or Firm*—Robert E. Kleve

[57] ABSTRACT

A storage box for mounting in the rear end of a pick up truck by extending laterally across the rear end of the truck. The truck has a towing hitch mounted to the rear of the truck immediately in front of the box, and a 5th wheel trailer has an elonated towing arm fixed to its front end which can be detachably mounted to the hitch of the truck while extending over the top of the storage box. The storage box has a bottom receptacle portion and a top cover portion pivotally mounted to the bottom portion. The cover portion has a depression intermediate the ends of the cover whereby the cover portion may be pivoted upward and the towing arm may be received in the depression in the cover portion while the ends of the cover portion may be beside the towing arm to enable the ends of the cover portion to have a greater depth and the cover portion to pivot upward at a greater angle for easier access into the bottom of the box.

2 Claims, 2 Drawing Sheets

STORAGE BOX

BACKGROUND OF THE INVENTION

This invention relates to storage boxes. More particularly, the invention relates to storage boxes for mounting to the back of a pick up truck having a hitch with a fifth wheel trailer attached to the hitch of the truck.

It is an object of the invention to provide a novel storage box having a bottom portion and a cover portion with the cover portion pivotally mounted to bottom portion to pivot upward to open the box to provide access to the interior of the box, with the cover portion having a depression intermediate its ends to enable the box to to mounted to the rear end of a pick up truck having a trailer hitch mounted to the back of the truck in front of the box with a trailer having a towing arm extending over the top of the box and attached to the hitch with the depression enabling the cover portion to pivot upward with the ends of the cover portion beside the towing arm and intermediate poriton of the cover portion below the arm to enable the cover portion to pivot to a wider angle for easier access to the box and enable the ends of the box to have more depth for greater storage capacity.

It is a further object of the invention to provide a novel storage box that can be mounted to the back of a pick up truck beneath the towing arm of a trailer when the towing arm is attached to a hitch on the truck and has a depression intermediate its ends of the cover portion to enable the cover to be opened upward with the ends of the cover portion on each side of the arm and the intermediate portion beneath the arm to provide greater depth to the box at the ends while enabling the cover portion to open upward a further distance.

Further objects and advantages of the invention will become apparent as the description proceeds and when taken in conjunction with the accompanying drawings wherein:

BRIEF DESCRIPTION OF PREFERRED EMBODIMENT

Briefly stated, the invention comprises an elongated storage box having a bottom receptacle portion and a top cover portion pivotally mounted to the bottom portion. The box is adapted to be mounted across the back rear end of a pick up truck, with the truck having a towing hitch mounted to the rear of the truck in front of the box, and with a fifth wheel trailer having a towing arm attached to the hitch of the truck. The top intermediate portion of the cover portion of the box has a V shaped depression, intermediate the ends of the cover portion, so that when the top cover portion of the box is pivoted toward the towing arm of the trailer the towing arm is received in the V shaped depression in the cover portion and the ends of the cover portion are beside the towing arm to enable the cover portion to pivot further upward in a wider arc to facilitate access to the bottom portion of the cover portion and to provide greater depth to the top cover portion at the ends of the cover portion to provide additional capacity for storage.

Figure 1:
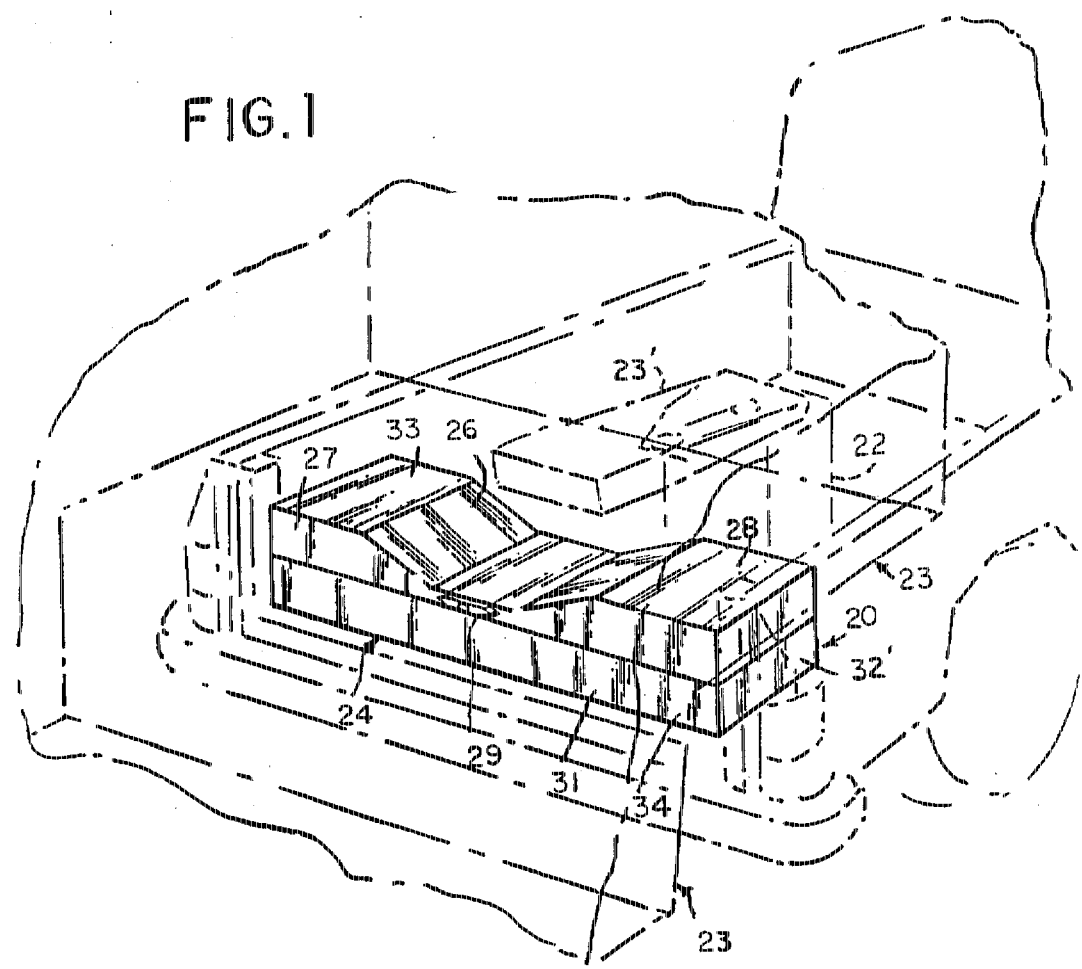
FIG. 1 is a perspective view of the storage box invention illustrating the box mounted in length laterally across the rear end of a pick up truck, with the truck having a towing hitch mounted on the truck in front of the box, and with a fifth wheel trailer having a towing arm with the towing arm attached to the hitch of the pick up truck, with the box having a substantially V-shaped depression in its cover portion.

Referring more particularly to the drawings, in FIG. 1 the storage box 20 is illustrated extending laterally across the rear end 21' of the back of the truck 21. The truck has a towing hitch 22 mounted to the back of the truck in front of the storage box 20; and a fifth wheel trailer 23 has a towing arm 23' fixed to its forward end with the towing arm 23' detachably mounted to the towing hitch 22 of the truck in a conventional manner.

Figure 2:
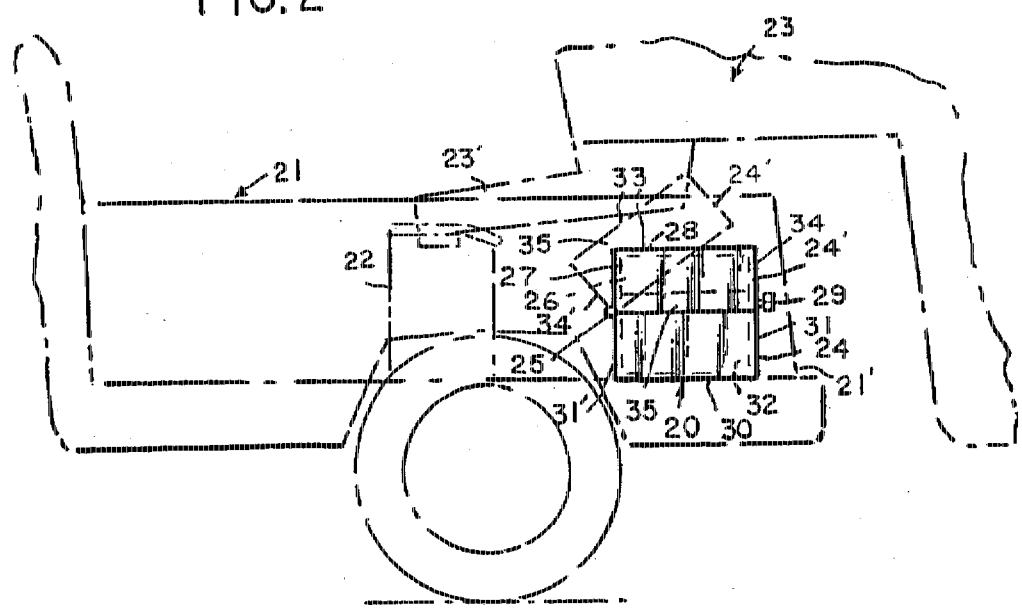
FIG. 2 is a side elevational view of the storage box having the V-shaped depression in its cover portion intermediate the ends of the cover portion. The box is shown in solid lines with the cover portion closed mounted to the back of the truck, with the truck having a towing hitch, with a trailer having a towing arm attached to the towing hitch, and with the truck towing hitch, towing arm and trailer shown in fragmentary phantom lines, and with the cover portion pivot upward and shown in its upward position in phantom lines while the towing arm is attached to the trailer hitch of the truck, with the V shape depression receiving the rear end of the towing arm, with the ends of the cover portion beside the towing arm.
Figure 3:
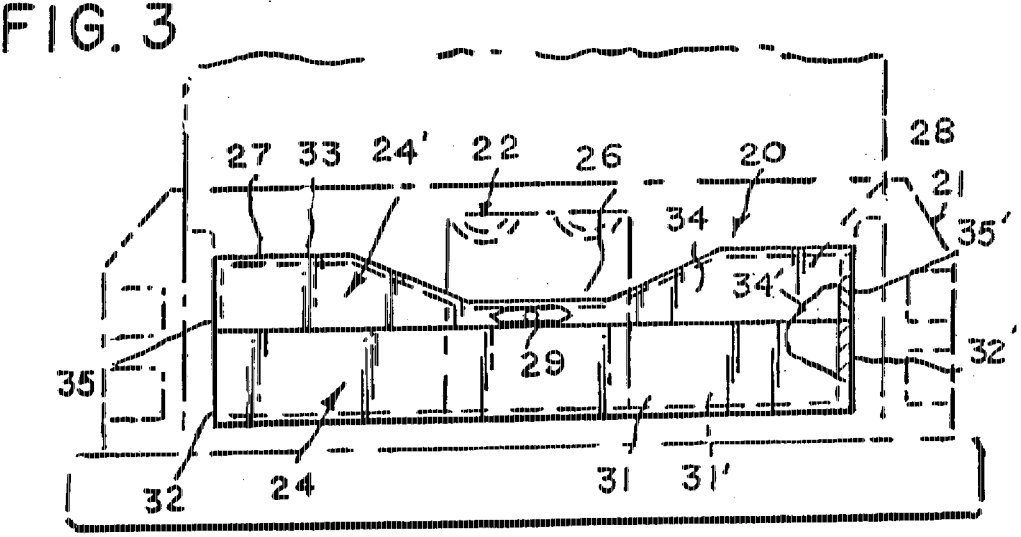
FIG. 3 is a rear view of the storage box with the V shaped depression in the cover portion and with the box shown mounted across the back of a pick up truck having a towing hitch.
Figure 4:
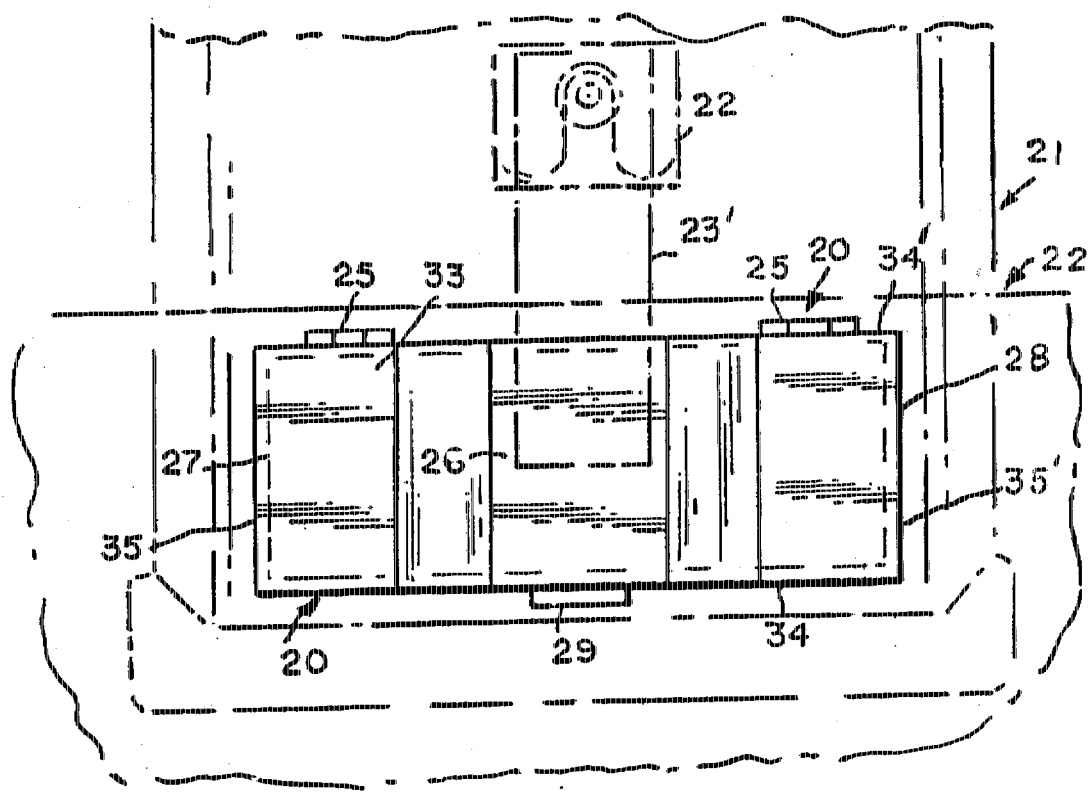
FIG. 4 is a top end view of the storage box with a V shaped depression shown attached across the back of the pick up truck with a hitch mounted to the truck, and with a 5th wheel trailer having a towing arm, and the arm attached to the hitch on the truck.

The storage box 20 is elongated and has a bottom receptacle portion 24 fixed to the floor of the back of the truck 21 and extendind in length across the rear end 21' of the truck. The box 20 has a pivotally mounted top, cover portion 24' pivotally mounted to the bottom receptacle portion 24 by hinges 25 along the rear side of the box. The cover portion 24' of the box has a substantially V-shaped depression 26 intermediate its ends 27 and 28 of the cover portion. The cover portion 24' has a handle 29 mounted to the rear face of the side 34 of the cover portion at an intermediate portion of the cover portion with the handle having conventional latch means to latch the top cover portion 24' to the bottom receptacle portion 24 when the cover portion is closed as shown in solid in FIG. 2.

The bottom receptacle portion 24 has a bottom panel 30 with four surrounding sides 31,31',32,32' fixed together to form the receptacle portion. The cover portion 24' has a top panel 33 with four surrounding sides 34,34',35,35' fixed together to form the cover portion. The opposing sides 34,34' have V shaped cut out intermediate their length to form a narrow intermediate portion, and the top panel 33 has the V shaped depression 26. The hinges are connected between the side 34' of the cover portion and the side 31' of the receptacle portion for the pivotal mounting.

OPERATION

The box 20 has a length to fit fully across the rear end 21' of the back of the truck. The V shaped depression in the cover portion 24' enables the cover portion 24' to be pivoted upward about its hinges 25 in a counter clockwise direction about the axis of the hinges 25, when viewed from FIG. 2. The V shaped depression 26 enables the cover portion 24' to be pivoted further upward toward the towing arm 23' with the towing arm 23' being received in the V shaped depression and the ends 27 and 28 of the cover portion beside the towing arm, which would not be possible without the depression. Further, it enables the ends 27 and 28 of the cover portion to have the full depth of the cover portion which it would have without the depression. This provides additional capacity to the box by allowing taller objects to be stored in the box at the ends, for example, while the cover portion may still be pivoted upward in a further or additional arc than would be otherwise possible without the depression to result in a larger opening into the bottom of the box for easier access into the box for storing, placing, and/or removing objects with greater ease; while the box is on the truck and while the trailer is attached by its towing arm to the hitch on the truck.

Thus it will be seen that a novel storage box has been provided that can be mounted to the rear end of a pick up truck, beneath the towing arm of a fifth wheel trailer when the towing arm is attached to the hitch on the truck for towing; and the depression in the top cover portion enables the top cover portion of the box to be pivoted upward about a relatively wider arc by the towing arm being received in the depression in the cover portion, while the ends of the cover portion travel upward beside the towing arm, than would be possible without the depression.

It will be obvious that various changes and departures may be made to the invention without departing from the spirit and scope thereof; and accordingly, it is not intended that the invention be limited to that specifically described in the specification or as illustrated in the drawings, but only as set forth in the appended claims wherein:

What is claimed is:

1. A storage device comprising, in combination:

a pick-up truck having a front cab portion and a rear bed portion wherein said rear bed portion includes a length defined by a front end proximate said cab portion and a rear end;

a trailer hitch mounted to said rear bed portion intermediate said front and rear ends;

a trailer disposed rearwardly of said bed portion and including a towing arm having a first end mounted to a forward end of said trailer and a second end extending forwardly toward said bed portion with a second end of said towing arm detachably mounted to said hitch; and an elongated storage box having a bottom receptacle portion having upstanding side walls and a cover portion having upstanding sidewalls wherein said cover portion and said bottom portion are pivotally mounted together to enable said cover portion to pivot upwardly with respect to said bottom portion, said storage box mounted to said rear bed portion intermediate said hitch and said rear end, said cover portion having a length defined by opposing ends substantially transverse to the length of said bed portion and a width defined by opposing ends substantially parallel to the length of said bed portion, said cover portion having a depression formed along the entire width and intermediate the length of said cover portion with said depression having a width in excess of the width of said towing arm whereby said cover portion may be pivoted upwardly with said depression receiving said towing arm such that said cover portion may be opened at a greater angle when said towing arm is connected to said hitch and extends over said storage box.

2. The storage device of claim 1 wherein said depression is substantially V shaped.

* * * * *